United States Patent [19]

Bülow et al.

[11] Patent Number: 5,587,003
[45] Date of Patent: Dec. 24, 1996

[54] REMOVAL OF CARBON DIOXIDE FROM GAS STREAMS

[75] Inventors: Martin Bülow, Basking Ridge; Loc Dao, Bound Brook; Frank R. Fitch, Bedminster, all of N.J.

[73] Assignee: The BOC Group, Inc., New Providence, N.J.

[21] Appl. No.: 407,817

[22] Filed: Mar. 21, 1995

[51] Int. Cl.$^6$ ................................................. B01D 53/047
[52] U.S. Cl. ................................. 95/123; 95/139; 95/902
[58] Field of Search .................. 62/13, 18; 95/117–120, 95/123, 139, 902

[56] References Cited

U.S. PATENT DOCUMENTS

| | | | |
|---|---|---|---|
| 3,751,878 | 8/1973 | Collins | 95/139 X |
| 3,808,773 | 5/1974 | Reyhing et al. | 95/139 X |
| 3,885,927 | 5/1985 | Sherman et al. | 55/68 |
| 4,012,206 | 3/1977 | Macriss et al. | 95/139 X |
| 4,070,164 | 1/1978 | Miwa et al. | 95/139 X |
| 4,233,038 | 11/1980 | Tao | 95/139 X |
| 4,249,915 | 2/1981 | Sircar et al. | 95/139 X |
| 4,264,340 | 4/1981 | Sircar et al. | 95/139 X |
| 4,515,605 | 5/1985 | Inoue et al. | 95/130 X |
| 4,627,856 | 12/1986 | von Gemmingen | 95/139 X |
| 4,711,645 | 12/1987 | Kumar | 95/139 X |
| 4,732,584 | 3/1988 | Coe et al. | 95/130 |
| 4,743,276 | 5/1988 | Nishida et al. | 95/902 X |
| 4,747,854 | 5/1988 | Maroulis et al. | 95/127 X |
| 4,775,396 | 10/1988 | Rastelli et al. | 55/58 |
| 4,935,580 | 6/1990 | Chao et al. | 95/139 |
| 4,964,889 | 10/1990 | Chao | 95/139 X |
| 5,156,657 | 10/1992 | Jain et al. | 95/139 X |
| 5,202,096 | 4/1993 | Jain | 95/139 X |
| 5,232,474 | 8/1993 | Jain | 95/139 X |

FOREIGN PATENT DOCUMENTS

| | | | |
|---|---|---|---|
| 61-255995 | 11/1986 | Japan | 95/139 |
| 0552102 | 4/1977 | U.S.S.R. | 95/139 |
| 0679228 | 8/1979 | U.S.S.R. | 95/139 |

OTHER PUBLICATIONS

Mark W. Ackley and Ralp T. Yang—Diffusion in Ion-Exchanged Clinoptitolites—AlChE Journal—Nov. 1991 vol. 37, No. 11.

Mark W. Ackley, R. F. Giese and Ralph T. Yan—Zeolites 1992, vol. 12, Sep./Oct.

Natural Zeolites—Academy of Sciences of the Georgian SSR—Scientific Council on Adsorbents of the Soviet Union Academy of Sciences—P. G. Melikishvili—Oct. 29–31, 1976.

*Primary Examiner*—Robert Spitzer
*Attorney, Agent, or Firm*—Coleman R. Reap; Larry R. Cassett

[57] ABSTRACT

Carbon dioxide is removed from a gas stream by passing the gas stream through a bed of natural or synthetic clinoptilolite or their chemically-modified derivatives. The process is particularly advantageous when applied to the removal of ppm levels of carbon dioxide from gas streams at temperatures above 20° C.

13 Claims, No Drawings

REMOVAL OF CARBON DIOXIDE FROM GAS STREAMS

FIELD OF THE INVENTION

This invention relates to the removal of carbon dioxide from gas streams, and more particularly to the prepurification of air by the removal of carbon dioxide from air prior to air separation.

BACKGROUND OF THE INVENTION

Gases that occur in nature or which are produced in industrial processes often contain carbon dioxide in small amounts. For example atmospheric air generally contains about 300 or more parts per million (ppm) carbon dioxide. Because of certain process constraints or a particular end use that the gas is intended for, it may sometimes be desirable or necessary to remove the carbon dioxide from the gas. For example, air that is separated into various component products by cryogenic distillation (cryogenic air separation) must be substantially free of both carbon dioxide and moisture. Cryogenic air separation is carried out at temperatures well below the freezing point of carbon dioxide and water. Consequently, if these components are not removed prior to cooling of the air they will freeze in and eventually clog the air separation process equipment.

Small amounts of carbon dioxide and moisture are removed from gas streams by various techniques, such as condensation, reversing heat exchange freezing and adsorption. A particularly preferred method is adsorption using an adsorbent which adsorbs carbon dioxide (and water vapor) more strongly than it adsorbs other components of the gas stream. For example, it is common to remove carbon dioxide from an air stream that is to be cryogenically separated, by passing the gas stream through a bed of zeolite 13X. U.S. Pat. No. 3,885,927, issued to Sherman et al. on May 27, 1975, discloses the use of type X zeolite containing at least 90 equivalent percent barium cations for the removal of carbon dioxide from gas streams containing not more than 1000 ppm carbon dioxide, at temperatures of −40° to 120° F. U.S. Pat. No. 4,775,396, issued to Rastelli et al. on Oct. 4, 1988, discloses the adsorption of carbon dioxide from gas streams by pressure swing adsorption at temperatures of −50° to 100° C., the adsorbent being a zeolite having a $SiO_2/Al_2O_3$ molar ratio of from 2 to 100 and containing at least 20 equivalent percent of one or more cations selected from zinc, rare earth, hydrogen and ammonium cations and not more than 80 equivalent percent of alkali metal or alkaline earth metal cations.

Zeolite 13X efficiently removes small amounts of carbon dioxide (and water vapor) from air streams at low temperatures, i.e. temperatures of about 5° C. or lower, because it more strongly adsorbs these components than it adsorbs nitrogen, oxygen or argon. However, the carbon dioxide selectivity and, to a greater extent, the adsorption capacity of zeolite 13X diminish rapidly as the temperature of the gas being separated increases, and the separation process becomes infeasible at temperatures above about 20° C. Since ambient temperatures are often above the preferred 5° C. adsorption temperature, and since, because of the heat of adsorption, there is a tendency for adsorption bed temperatures to increase considerably during the course of an adsorption process, it is usually necessary to cool air fed to an adsorption-based air prepurification plant by means of external refrigeration to maintain the gas at temperatures below 20° C. This reduces the overall efficiency of the air separation process, since energy must be consumed to provide the necessary refrigeration.

It would be very advantageous to completely eliminate the need for refrigeration or to significantly reduce the amount of refrigeration required in commercial air separation adsorption-based prepurification procedures, since that would enhance the overall economic attractiveness of the air separation process. The present invention provides a novel carbon dioxide adsorption process which provides such an advantage, and eliminates the need for environmentally harmful refrigerants, such as the freons.

SUMMARY OF THE INVENTION

According to the invention, a gas stream is purified by the removal of carbon dioxide from the gas stream by passing the gas stream through a bed of clinoptilolite at a temperature in the range of about −50° to about 80° C. The process of the invention can be used to purify any gas that is less strongly adsorbed by clinoptilolite than carbon dioxide and which contains not more than about 1000 parts per million (ppm) levels of carbon dioxide as an impurity. Typical of gases that can be purified by the process of the invention are air, nitrogen, oxygen, argon, methane, etc.

The adsorbent may be natural clinoptilolite, or it may be cation-exchanged with one or more of the various monovalent, divalent or trivalent ions selected from Groups IA, IIA and IIIA of the Periodic Table, lanthanide series ions, chromium (III), iron (III), zinc (II) or copper (II). Preferred adsorbents are clinoptilolite having as exchangeable cations one or more of sodium, potassium, lithium, calcium, magnesium, barium, strontium, aluminum, scandium, gallium, indium, yttrium, lanthanum, cerium, praseodymium and neodymium ions. The most preferred cations are sodium, lithium, calcium, magnesium, aluminum, cerium and lanthanum and mixtures of these.

The adsorption step of the process of the invention is beneficially carried out at temperatures in the range of about 20° to about 80° C. Very good results are obtained when the adsorption step is carried out at a temperature in the range of about 30° to about 60° C.

The carbon dioxide purification is preferably carried out by a cyclic process, more preferable as pressure swing adsorption (PSA), temperature swing adsorption (TSA), or combinations of these. In the most preferred embodiment, the process is a TSA process.

The carbon dioxide concentration of gas streams purified by the process of the invention is preferable not more than 600 ppm, and most preferably not more than 350 ppm.

The process of the invention can comprise the single operation of carbon dioxide adsorption, or it may comprise a combination of purification operations, including carbon dioxide adsorption and one or more of air separation, hydrogen oxidation, carbon monoxide oxidation, etc. In a preferred procedure carbon dioxide is removed from air by the above-described adsorption method and the purified air is separated by cryogenic distillation into nitrogen, oxygen, argon or combinations of two or more of these.

The carbon dioxide adsorption step with the clinoptilolite adsorbent can also be used to remove moisture from the gas stream, if present. In a preferred embodiment, moisture is removed prior to carbon dioxide adsorption by, for example, passing the gas stream through a desiccant, preferably alumina, silica gel or mixtures of these.

DETAILED DESCRIPTION OF THE INVENTION

The process of the invention is particularly useful for removing carbon dioxide at low concentrations i.e. parts per million (ppm) levels, from gas streams at temperatures above about 20° C. Although the process can be successfully used to remove carbon dioxide from gas streams which contain the carbon dioxide at concentrations greater than 1000 ppm, it is most effective for removing carbon dioxide from a gas stream when the carbon dioxide is present in the gas stream at concentrations up to about 1000 parts per million (ppm).

The adsorbents useful in the process of the invention are the natural and synthetic clinoptilolites and their chemically modified derivatives. Natural clinoptilolite generally has as exchangeable cations one or more of potassiumions, sodiumions, calciumions and magnesiumions. Cation-exchanged natural or synthetic clinoptilolite may also be used in the invention. Included among the ions that may occupy exchangeable cation sites on the clinoptilolite adsorbent are ions of Groups IA, IIA, IIIA, IIIB of the periodic table, trivalent ions of the lanthanide series of elements, zinc (II)ion, copper (II)ion, chromium (III)ion, iron (III)ion, the ammonium ion, the hydronium ion or mixtures of two or more ions from any of these categories. Preferred Group IA ions are sodium, potassium and lithium ions; preferred Group IIA ions are magnesium, calcium, strontium and barium ions; preferred Group IIIA and IIIB ions are aluminum, scandium, gallium, indium and yttrium; and preferred trivalent lanthanide ions are lanthanum, cerium, praseodymium and neodymium. The most preferred clinoptilolites are the natural and synthetic clinoptilolites having as exchangeable cations one or more ions selected from: sodium, potassium, lithium, calcium, magnesium and barium ions.

The process of the invention may be carried out in a single adsorption vessel or a battery of two or more beds arranged in parallel and adapted to be operated in a cyclic process comprising adsorption and desorption. In such systems the beds are cycled out of phase to assure a pseudo-continuous flow of purified gas from the adsorption system.

The process of the invention is generally practiced as a cyclical process, such as temperature swing adsorption, pressure swing adsorption, vacuum swing adsorption, or combinations of these. The process is particularly useful for removing small amounts of carbon dioxide from air by temperature swing adsorption. The carbon dioxide removal process is ideally coupled with an air separation process, such as cryogenic distillation of air, to produce high purity nitrogen, oxygen, argon or combinations of two or more of these high purity gas products.

The temperature at which the adsorption step is carried out may vary from a minimum temperature of about −50° C. to a maximum of about 80° C. It has been discovered that the efficiency of the adsorption process does not drop off with increasing adsorption temperature, as rapidly as when conventional adsorbents are used in the process. This feature makes the process advantageous for use in warm weather climates where the temperature during the adsorption step is above about 20° C., or even above about 40° C. Although the adsorption process can be carried out at temperatures up to about 80° C., it is preferable that the temperature not exceed about 60° C. and most preferable that it not exceed about 50° C.

The absolute pressures at which the adsorption step is carried out generally ranges from about 0.2 to about 20 bar, and preferably ranges from about 1 to 10 bar.

When the adsorption process is PSA the regeneration step is generally carried out a temperature in the neighborhood of the temperature at which the adsorption step is carried out and at an absolute pressure lower than the adsorption pressure. The pressure during the regeneration step of PSA cycles is usually in the range of about 200 to about 5000 millibar, and preferably in the range of about 100 to about 2000 millibar. When the adsorption process is TSA, bed regeneration is carried out at a temperature higher than the adsorption temperature, usually in the range of about 50° to about 250° C., and preferably in the range of about 100 to 200° C. In the TSA embodiment, the pressure can be the same during the adsorption and regeneration steps, but it is often preferred to desorb to about atmospheric pressure. When a combination PSA/TSA process is employed, the temperature and pressure during the bed regeneration step are higher and lower, respectively, than they are during the adsorption step.

In starting a cyclical process according to the invention, the gaseous feed stream from which carbon dioxide is to be removed is introduced into an adsorption vessel containing a bed of the above-mentioned adsorbent. As the gas passes through the bed of adsorbent carbon dioxide is adsorbed and a substantially carbon dioxide-free nonadsorbed product gas passes out of the adsorption vessel through the nonadsorbed gas outlet. As the adsorption step proceeds, a carbon dioxide front forms in the adsorbent bed and slowly moves toward the nonadsorbed gas outlet end of the bed. When the adsorbed carbon dioxide front traveling through the adsorption vessel(s) in which the adsorption step is being carried out reaches the desired point in the vessel(s), the adsorption process in these vessel(s) is terminated and these vessel(s) enter the regeneration mode. During regeneration, the carbon dioxide-loaded vessels are depressurized, if the adsorption cycle is pressure swing adsorption; heated, if a temperature swing adsorption cycle is employed; or both depressurized and heated, if a combination pressure swing-temperature swing process is used.

The method of regeneration of the adsorption beds depends upon the type of adsorption process employed. In the case of pressure swing adsorption, the regeneration phase generally includes a countercurrent depressurization step during which the beds are vented countercurrently until they attain the desired lower pressure. If desired the pressure in the beds may be reduced to subatmospheric pressure by means of a vacuum inducing device, such as a vacuum pump.

In some cases, in addition to the countercurrent depressurization step(s), it may be desirable to countercurrently purge the bed with the nonadsorbed product gas stream exiting the adsorbent bed(s). In this case the bed(s) may be countercurrently purged with nonadsorbed gas, and the purge step is usually initiated towards the end of the countercurrent depressurization step, or subsequent thereto. During this purge step, the purge gas can be introduced into the adsorbent bed from an intermediate storage facility when the adsorption system comprises a single adsorber; or from another adsorber that is in the adsorption phase, when the adsorption system comprises multiple adsorbers arranged in parallel and operated out of phase.

The adsorption cycle may contain steps other than the fundamental steps of adsorption and regeneration. For example, it may be advantageous to depressurize the adsorption bed in multiple steps, with the first depressurization product being used to partially pressurize another bed in the adsorption system. This will further reduce the amount of gaseous impurities in the nonadsorbed product gas.

According to a preferred embodiment of the invention, a gas stream, such as air, is introduced into an adsorption vessel containing a clinoptilolite of the type described above. The gas stream may be at a temperature as low as −50° C., or less, or as high as 80° C. Provided that the concentration of carbon dioxide in the gas stream is not significantly greater than about 1000 ppm, substantially all of the carbon dioxide will be removed from the gas stream, and the substantially carbon dioxide-free product gas will issue from the nonadsorbed product gas outlet of the adsorption vessel. When the carbon dioxide adsorption front reaches a predetermined point in the adsorption vessel, usually near the nonadsorbed product gas outlet, the adsorption process in the vessel is terminated, and the adsorbent bed contained in the vessel is regenerated in one of the methods described above. If the adsorption plant is a multiple bed system, adsorption will immediately begin in a second bed, so that the continuity of the purification process will not be interrupted. The prepurified gas can be subjected to further processing. For example, in cryogenic air separation operations, the prepurified air is sent to a cryogenic distillation (or adsorption) plant for fractionation into one or more high purity gases. If desired, a waste gas stream from the air separation plant can be recycled to the prepurification plant for use as purge gas during bed regeneration.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Equilibrium adsorption isotherms for carbon dioxide were measured using a Cahn microbalance at a series of pressures in the range of 2 to 300 mbar at temperatures of 5° C., 35° C. and 50° C. for a conventional sodium X zeolite (NaX) having silicon-to-aluminum atomic ratio of 1.25, and for an Indonesian natural clinoptilolite which was first beneficiated by washing with hot water, and then extensively ion-exchanged with calcium chloride solution of 80° C. Chemical analysis of the clinoptilolite sample (Indonesian natural clinoptilolite) showed its weight percentage composition to be: 64.7% $SiO_2$; 13.8% $Al_2O_3$; 3.9% $CaO$; 2.5% $K_2O$; 1.0% $Fe_2O_3$; 0.8% $MgO$; 0.26% $TiO_2$; 0.23% $Na_2O$; and 0.01% $MnO$. Each sample of adsorbent (about 60 mg) was activated by being evacuated at 350° C. for 1.5 hours in situ in the Cahn microbalance before the first run and between the isotherms taken at each temperature. Each test was conducted until equilibrium was achieved, which required up to 3 hours for the lowest partial pressures of carbon dioxide. The results of the experiments are recorded in the table.

| Pressure., mbar | | 2 | 5 | 10 | 50 | 100 | 300 |
| --- | --- | --- | --- | --- | --- | --- | --- |
| Adsorbent | Temp., °C. | Carbon Dioxide Uptake, mmol/gm of adsorbent | | | | | |
| NaX | 5 | 1.24 | 1.80 | 2.23 | 3.53 | 4.11 | 4.79 |
| Ca Clino.[1] | 5 | 1.13 | 1.31 | 1.46 | 1.89 | 2.04 | 2.18 |
| NaX | 35 | 0.45 | 0.87 | 1.26 | 2.26 | 2.78 | 3.73 |
| Ca Clino. | 35 | 0.81 | 1.04 | 1.17 | 1.47 | 1.65 | 1.93 |
| NaX | 50 | 0.25 | 0.55 | 0.87 | 1.83 | 2.27 | 3.14 |
| Ca Clino. | 50 | 0.64 | 0.91 | 1.07 | 1.34 | 1.48 | 1.76 |

[1]calcium clinoptilolite

From the table it is clear that at moderately high $CO_2$ partial pressures (e.g. 300 mbar) the calcium clinoptilolite used in this example has a much lower $CO_2$ capacity than does conventional sodium X adsorbent. The unexpected nature of this invention is exemplified in the results obtained at less than or equal to 5 mbar of $CO_2$, which is typical of air at a pressure of about 15 atmospheres, and at a temperature greater than 20° C. The capacities of the adsorbents of this invention are more than 20% greater, and in some cases more than twice those of the conventional type X adsorbent under the same conditions.

Although the invention has been described with particular reference to specific equipment arrangements, to specific adsorption cycles, and to specific experiments, these features are merely exemplary of the invention and variations are contemplated. For example, the adsorption cycle may include more than two bed equalization steps, and the purge step and/or the nonadsorbed product backfill step may be included or eliminated, as desired. Furthermore, the duration of the individual steps and the operating conditions may be varied. The scope of the invention is limited only by the breadth of the appended claims.

What is claimed is:

1. A method of removing carbon dioxide from a gas stream selected from oxygen, nitrogen, argon and mixtures of these which contains carbon dioxide at a partial pressure not greater than about 10 mbar as an impurity, comprising subjecting said gas stream to adsorption using clinoptilolite as the adsorbent at a temperature in the range of about 20° to about 80° C., thereby adsorbing substantially all of the carbon dioxide from the gas stream.

2. The method of claim 1, wherein the adsorption is part of a process selected from temperature swing adsorption, pressure swing adsorption, vacuum swing adsorption and combinations of these.

3. The method of claim 2, wherein said clinoptilolite has exchangeable cations selected from ions of Group 1A, Group 2A, Group 3A, Group 3B, the lanthanide series and mixtures of these.

4. The method of claim 1 or claim 2, wherein said clinoptilolite is selected from natural clinoptilolite, synthetic clinoptilolite, sodium-exchanged clinoptilolite, potassium-exchanged clinoptilolite, lithium-exchanged clinoptilolite, calcium-exchanged clinoptilolite magnesium-exchanged clinoptilolite, barium-exchanged clinoptilolite, and mixtures of these.

5. The method of claim 1 or claim 2, wherein the adsorption is carried out at a temperature in the range of about 30° to about 60° C.

6. The method of claim 5 wherein said gas stream is air.

7. The method of claim 1 or claim 2, additionally comprising, prior to removing carbon dioxide from said gas stream, removing water vapor from the gas stream by passing the gas stream through an adsorbent selected from alumina, silica gel, and mixtures of these.

8. A method of separating air comprising the steps:

(a) prepurifying air containing carbon dioxide at a partial pressure not greater than about 10 mbar by subjecting the air to a temperature swing adsorption process comprising an adsorption step carried out at a temperature in the range of about 20° to about 80° C. and an adsorbent regeneration step using clinoptilolite as adsorbent, thereby adsorbing substantially all of the carbon dioxide from the air; and (b) subjecting the prepurified air to cryogenic distillation, thereby producing high purity nitrogen, high purity oxygen or both of these.

9. The method of claim 8, wherein said adsorbent additionally adsorbs water vapor from said air.

10. The method of claim 8, additionally comprising, prior to step (a), the step of removing water vapor from the air by passing the air through an adsorbent selected from alumina, silica gel and mixtures of these.

11. The method of claim 8, wherein the concentration of carbon dioxide in said air is not greater than about 500 ppm.

12. The method of claim 8, wherein said clinoptilolite is selected from natural clinoptilolite, lithium-exchanged clinoptilolite, calcium-exchanged clinoptilolite and mixtures of these.

13. The method of claim 12, wherein said adsorption step is carried out at a temperature in the range of about 30° to about 60° C.

\* \* \* \* \*